Figure 1:
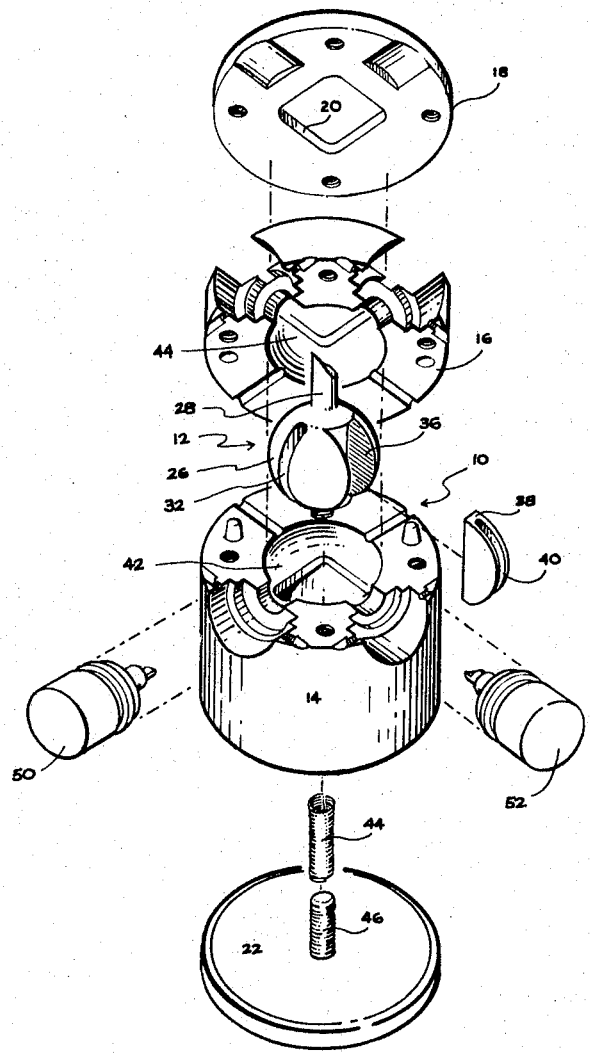

RICHARD O. MUSICK
ROBERT R. BALLARD
WILLIAM L. ROBERTSON
INVENTORS

BY

ATTORNEYS

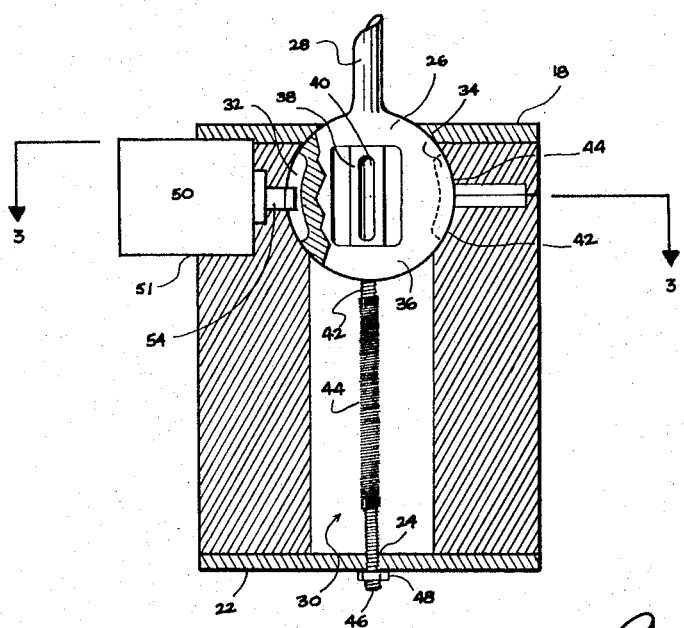
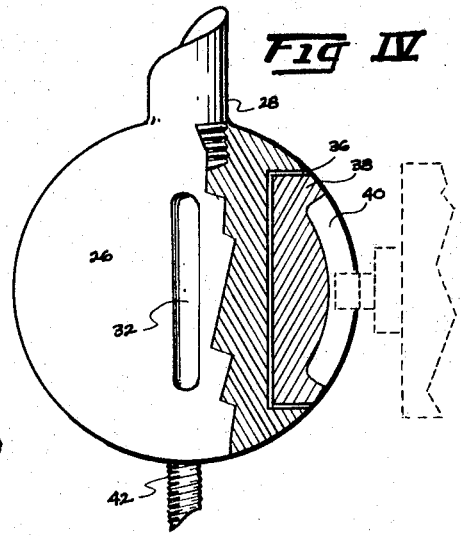
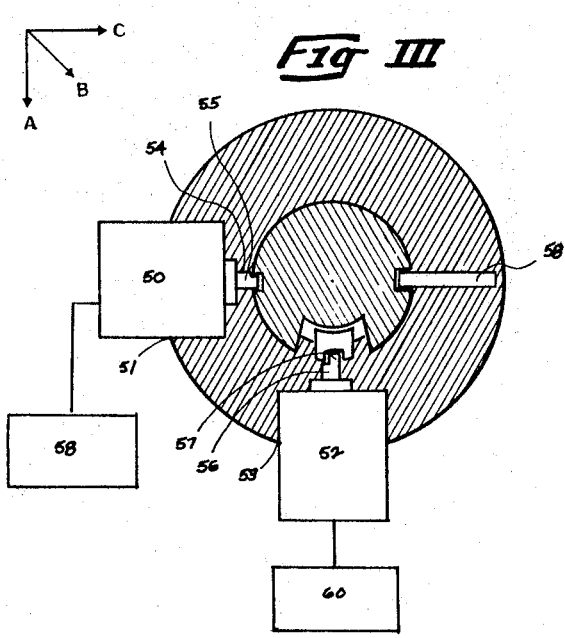

United States Patent Office

3,323,386
Patented June 6, 1967

---

3,323,386
TWO-AXIS CONTROLLER
Richard O. Musick, Robert R. Ballard, and William L. Robertson, all of Lancaster, Calif., assignors to the United States of America as represented by the Administrator of the National Aeronautics and Space Administration
Filed Aug. 2, 1965, Ser. No. 476,759
6 Claims. (Cl. 74—471)

The invention described herein may be manufactured and used by or for the Government of the United States of America for governmental purposes without the payment of any royalties thereon or therefor.

The present invention relates generally to control devices wherein movement of a single member is translated into corresponding movement of two or more other members. More particularly, the invention relates to a control device, more commonly termed a joystick mechanism, in which displacement of a single manually operated control stick results in varying the output of two potentiometers to deliver two control signals and thus provide dual control in varying degrees from a single control movement.

Joystick mechanisms have been widely used for controlling the flight of experimental flight vehicles, drones, guided missiles and any other vehicle or vehicle simulator requiring two simultaneous control movements in varying degrees from a single manual control movement. These mechanisms usually include a control stick fixed to a ball member mounted in a suitable support structure such that movement of the control stick will result in rotation of the ball member about its center. Rotation of the ball about its center is translated through suitable cam, gear and shaft arrangements to two or more gears or variable resistance devices that in turn control the position of, for example, the control surfaces of an aircraft. These devices, while performing satisfactorily, have been rather complicated and bulky mechanisms in that considerable apparatus was necessary to translate the motion of the ball member into movement of the control surfaces of an aircraft.

A control device constructed in accordance with the present invention, as discussed hereinafter, avoids the disadvantages of previous devices and provides a simple, small and highly reliable control device. This is accomplished by mounting a control stick on a ball member rotatably mounted in a support structure for rotation about its center. The ball member has a plurality of slots and a slideway formed therein. A slide member that includes a slot is slideably mounted in the slideway. The slot formed in the slide member and one of the slots formed in the ball member each receive a control shaft of a potentiometer mounted in a suitable position in the support structure. The output shaft of each potentiometer can then be rotated to vary the output of the potentiometer by rotation of the ball member about its center. This construction permits a direct connection of the potentiometer control shafts to the ball member and thus reduces the complexity and size of the mechanism.

It is therefore a principal object of this invention to provide a control device which is simple, more compact, and more reliable than existing control devices.

Another object of this invention is to provide a control device utilizing a pair of potentiometers whose control shafts are directly coupled to and rotated by a rotatable ball member.

Other objects and advantages of the present invention will become more apparent by considering the detailed description below in conjunction with the attached drawing wherein:

FIG. 1 is an exploded view of the two-axis controller.
FIG. 2 is a side elevation, in cross-section, of the two-axis controller.
FIG. 3 is a view along lines 3—3 of FIG. 2.
FIG. 4 is a view of the ball member, partially in section, removed from its support structure.

Referring now to FIG. 1 of the drawings, there is shown a control device consisting of a cylindrical housing 10 in which a ball assembly 12 is rotatably mounted. Housing 10 consists of a first lower cylindrical portion 14 that supports the ball member and a second cylindrical section 16 mounted on section 14 by bolts, screws or any other suitable means (not shown) to retain the ball member in position. The upper end of housing 10 is closed by a cover plate 18 having an aperture 20 formed therein and the lower end of housing 10 is closed by a cover plate 22 having an aperture 24 in the center thereof.

Ball assembly 12 consists of a ball member 26, a control stick 28 fixed to the ball member and extending upwardly therefrom, and a ball positioning assembly 30 attached between the lower end of ball member 26 and bottom cover plate 22. The ball assembly also includes, as more clearly shown in FIGS. 2 and 3, two arcuate slots 32 and 34 that occupy diametrically opposed positions in the periphery of ball member 26. A third and larger slot or slideway 36 is formed in the periphery of ball member 26 in a position intermediate the position of slots 32 and 34. A slide member 38 is mounted in slot 36 for lateral sliding movement therewithin. Slide member 38 includes an arcuate slot 40 which is substantially identical to slots 32 and 34. A bearing surface 42 is formed in section 14 of housing 10 to support the ball member and a bearing surface 44 is provided in section 16 of housing 10 to retain the ball member in position. The curvature of bearing surfaces 42 and 44 is such that ball 26 will be restrained against any lateral or vertical displacement but is easily rotated about its center. The bearing surfaces also function to retain slideable element 38 in slideway 36.

Ball positioning assembly 30 consists of a rod 42 fixed to the lower end of ball 26. Rod 42 has a spring 44 attached thereto and this spring extends downwardly to a point where it is attached to a second rod 46 extending through opening 24 in bottom cover plate 22. The lower end of rod 46 is threaded to receive a nut 48 which can be tightened to tension spring 44. When ball member 26 is rotated about its center rod 42 will be displaced and tension on spring 44 will be increased. When the force applied to ball 26 for rotation thereof is removed the spring tension in spring 44 will automatically return ball 26 to what is termed a neutral position wherein rod 42 is in a vertical position.

Referring now to FIGS. 1 and 3, a pair of potentiometers 50 and 52 are mounted in suitable recesses 51 and 53 in housing sections 14 and 16. Potentiometer 50 has a control shaft 54 extending therefrom and this control shaft extends through the housing and into arcuate slot 32. The end 55 of control shaft 54 that extends into slot 32 is squared off so that rotation of the ball member in the direction indicated by arrow A will result in rotation of the control shaft whereas rotation of the ball member in the direction of arrow C will not rotate control shaft 54. Potentiometer 52 has a similar control shaft 56, having a squared off end 57, which extends into the arcuate slot formed in slide member 38. Rotation of the ball member in the direction indicated by arrow C will result in rotation of control shaft 56 whereas rotation of the ball member in the direction indicated by arrow A will not rotate the control shaft. It is necessary that slot 40 be movable with respect to the ball member or otherwise there would be a binding between the ball member and the two potentiometer shafts when the ball member was rotated. Since the slots are vertically oriented and are positioned on a ball member, it is apparent that the top and bottom portions of the slots are closer together than are the middle portions thereof. Since the potentiometer shafts are fixed, it is apparent that if the ball member were rotated such that the control shafts were in the upward end of the slots there would be interference therebetween if one of the slots were not moveable. A third arcuate slot 34 is formed in the periphery of ball member 26 in a position such that it is diametrically opposed to arcuate slot 32. This slot receives a guide pin 58 which prevents torsional movements of the ball member about its center.

It is apparent from a consideration of FIG. 3 that movement of the control stick such that ball 26 is rotated in the direction of arrow A will result only in rotation of the control shaft of potentiometer 50. Likewise, rotation of ball member 26, in the direction of arrow C, will result only in rotation of the control shaft of potentiometer 52, however, rotation of the ball member in the direction of arrow B will result in rotation of control shafts of both potentiometers and thus the output of both potentiometers will be varied. Rotation of ball member 26 in some direction between that indicated by arrow B and C will result in a considerable rotation of control shaft 56 and a lesser amount of rotation of control shaft 54. Therefore, the variation in a control signal from potentiometer 52 will be considerably greater than the variation in the control signal from potentiometer 50 due to the greater amount of rotation of control shaft 56. Potentiometer 50 is connected to and delivers a control signal to a control device 58 which could, for example, be a control surface of an aircraft. Potentiometer 52 is likewise connected to and delivers a control signal to a second control device 60 which could be a second control surface of an aircraft.

The operation, in summary, is rather simple and it is apparent that movement of the control stick 28 along a vertical or horizontal axis will rotate the control shaft of only one of the two potentiometers whereas movement of the control stick in any direction other than along the horizontal and vertical axes will result in rotation of both control shafts to a greater or lesser degree depending upon the angle from the vertical or horizontal through which the control stick is moved.

This completes the detailed description of the invention. While a preferred exemplary embodiment has been disclosed herein, it will be obvious to one skilled in the art to which this invention relates that many changes and modifications thereto can be made without departing from the spirit and scope of the invention, as defined in the claims appended hereto.

What is claimed is:
1. A control device comprising:
 (a) a support structure that includes a bearing surface;
 (b) a ball member rotatably supported in said bearing surface;
 (c) resilient means connected between said support structure and said ball member for biasing said ball member to a neutral position;
 (d) actuator means connected to said ball member for rotating said ball member away from the neutral position;
 (e) an outwardly opening slot in said ball member;
 (f) a slideway in said ball member;
 (g) a slide member slideably mounted in said slideway, said slide member having an outwardly opening slot therein;
 (h) a first control mechanism connected to said support structure, said first control mechanism including a control shaft which extends into the slot in said ball member;
 (i) a second control mechanism connected to said support structure, said second control mechanism including a control shaft which extends into the slot in said slide member, whereby rotation of said ball member will rotate the control shafts of said first and second control mechanisms to determine the degree of control exerted thereby.

2. A control device comprising:
 (a) a support structure that includes a bearing surface;
 (b) a ball member rotatably mounted on said bearing surface;
 (c) resilient means connected between said ball member and said support structure for biasing said ball member to a neutral position;
 (d) actuator means fixed to said ball member for imparting a desired amount of rotation thereto;
 (e) an outwardly opening slot in said ball member;
 (f) a slideway in said ball member;
 (g) a slide member slideably mounted in said slideway, said slide member having an outwardly opening slot therein;
 (h) a first control means mounted in said support structure whose output controls a first mechanism, said first control means including a control shaft whose angular position determines the output of said first control means, said output shaft extending into the slot in said ball member for rotation thereby when said ball member is rotated;
 (i) a second control means mounted in said support structure whose output controls a second mechanism, said second control means including a control shaft whose angular position determines the output of said second control means and which extends into the slot in said slide member and is rotated thereby when said ball member is rotated, whereby, rotation of said ball member will control the amount of control exerted by said first and second control means on said first and second mechanisms.

3. A control device for providing simultaneous dual control movements from a single manually operated control comprising:
 (a) a housing having a bearing surface;
 (b) a ball member rotatably mounted in said bearing surface, said ball member having an upwardly extending control stick fixed thereto;
 (c) a slot formed in said ball member;
 (d) a slideway formed in said ball member;
 (e) a slide member having an arcuate slot formed therein slideably mounted in said slideway;
 (f) a first control means mounted in said housing in a position such that a control shaft extending therefrom will extend into said arcuate slot and be rotated thereby when said ball member is rotated to vary the output of said first control means and
 (g) a second control means mounted in said housing in a position such that a control shaft extending therefrom will extend into the arcuate slot formed in said slide member and be rotated thereby when said ball member is rotated to vary the output of said second control means.

4. A mechanism for providing simultaneous dual control movements from a single manual control movement, said mechanism comprising:
 (a) a housing having a socket formed therein;
 (b) a ball member rotatably mounted in said socket, said ball member having a control stick extending therefrom, whereby movement of said control stick will rotate said ball member about its center;
 (c) an arcuate slot formed in said ball member;
 (d) a rectangular slideway formed in said ball member;
 (e) a slide member having an arcuate slot formed therein slideably mounted in said rectangular slideway;
 (f) a first potentiometer mounted in said housing, said first potentiometer having a control shaft that extends through an opening in said housing and into said arcuate slot in said ball member;
 (g) a second potentiometer mounted in said housing, said second potentiometer having a control shaft that extends through an opening in said housing and into the arcuate slot in said slide member, whereby rotation of said ball member will rotate the control shafts of the potentiometers to vary the outputs thereof; and (h) means connected between said ball means and said housing for biasing said control stick to a neutral position.

5. A two axis controller comprising:
(a) a support structure;
(b) a ball member rotatably mounted in said support structure for rotation about its center;
(c) a control stick attached at one end to said ball member whereby a force exerted on said control stick will result in rotation of said ball member;
(d) resilient means connected between said support structure and said ball member for maintaining said ball member in a neutral position wherein said control stick is in a vertical and upwardly extending position;
(e) a first outwardly opening arcuate slot formed in said ball member that is vertically oriented when said ball member is in the neutral position;
(f) a slideway formed in said ball member;
(g) a slide member slideably mounted in said slideway, said slide member having a second outwardly opening arcuate slot formed therein that is vertically oriented when said ball member is in the neutral position;
(h) a first control means mounted in said support structure that is operatively connected to a first control surface for controlling the movement thereof, said first control means including a first rotatable control shaft whose angular position determines the amount of control exerted by said first control means on the first control surface, said first control shaft extending through said support structure and into said first arcuate slot;
(i) a second control means mounted in said support structure that is operatively connected to a second control surface for controlling the movement thereof, said second control means including a second control shaft whose angular position determines the degree of control exerted by said second control means on the second control surface, said second output shaft extending into said second arcuate slot formed in said slide member.

6. A two-axis controller comprising:
(a) a support structure;
(b) a ball member rotatably mounted in said support structure for rotation about its center;
(c) a control stick attached attached at one end thereof to said ball member whereby movement of said control stick will rotate said ball member about its center;
(d) resilient means connected between said support structure and said ball member for biasing said ball member to a neutral position wherein said control stick is in a vertical and upwardly extending position;
(e) two outwardly opening arcuate slots formed in said ball member, said two slots being oriented vertically when said ball member is in the neutral position;
(f) a slideway formed in said ball member;
(g) a slide member having an outwardly opening and vertically oriented arcuate slot slideably mounted in said slideway, said two arcuate slots and said arcuate slot in said slide member being spaced substantially 90° apart about the periphery of said ball member;
(h) a first potentiometer supported in said support structure, said first potentiometer including a control shaft which extends into one of said two arcuate slots;
(i) a second potentiometer supported in said support structure, said second potentiometer including a control shaft that extends into the arcuate slot formed in said slide member;
(j) a guide pin mounted in said support structure that extends into the other one of said two arcuate slots to maintain the alignment of said ball member, whereby rotation of said ball member will result in rotation of said potentiometer control shafts to vary the output of said potentiometers.

No references cited.

MILTON KAUFMAN, *Primary Examiner.*